United States Patent
Nauert

(10) Patent No.: US 7,162,975 B1
(45) Date of Patent: Jan. 16, 2007

(54) SHADE FOR HUMMINGBIRD FEEDER

(76) Inventor: Uta Nauert, 7460 N. River Rd., Milwakee, WI (US) 53217

( * ) Notice: Subject to any disclaimer, the term of this patent is extended or adjusted under 35 U.S.C. 154(b) by 544 days.

(21) Appl. No.: 10/248,569

(22) Filed: Jan. 29, 2003

(51) Int. Cl.
*A01K 7/00* (2006.01)

(52) U.S. Cl. ......................................... 119/72

(58) Field of Classification Search ................. 119/72, 119/51.5, 52.2, 52.3, 57.9, 77, 57.8, 51.03, 119/57.92, 74; D30/121
See application file for complete search history.

(56) References Cited

U.S. PATENT DOCUMENTS

| | | | | |
|---|---|---|---|---|
| 697,343 | A | * | 4/1902 | Lathrop ..................... 119/72 |
| 3,292,589 | A | * | 12/1966 | Williams ..................... 119/77 |
| 3,913,527 | A | * | 10/1975 | Kilham ...................... 119/74 |
| 4,030,451 | A | * | 6/1977 | Miller ...................... 119/57.9 |
| 4,031,856 | A | | 6/1977 | Chester |
| 4,102,308 | A | * | 7/1978 | Kilham ..................... 119/52.3 |
| 4,207,839 | A | * | 6/1980 | Barry ....................... 119/57.9 |
| 4,712,512 | A | * | 12/1987 | Schreib et al. ............ 119/52.2 |
| 4,821,681 | A | | 4/1989 | Tucker |
| 4,901,673 | A | * | 2/1990 | Overstreet ................... 119/77 |
| 5,062,390 | A | * | 11/1991 | Bescherer et al. ............ 119/72 |
| 5,191,857 | A | | 3/1993 | Boaz |
| 5,269,258 | A | * | 12/1993 | Brown ...................... 119/57.9 |
| 5,454,348 | A | * | 10/1995 | Colwell et al. ............... 119/72 |
| 5,507,249 | A | * | 4/1996 | Shaw ......................... 119/72 |
| 5,628,277 | A | | 5/1997 | Machado |
| 5,791,286 | A | * | 8/1998 | Taussig et al. ............ 119/52.3 |
| 5,893,335 | A | | 4/1999 | Goodwin |
| 5,975,015 | A | * | 11/1999 | Runyon et al. ............ 119/52.1 |
| D429,852 | S | | 8/2000 | Hogarty |
| 6,269,769 | B1 | | 8/2001 | Wenstrand |

OTHER PUBLICATIONS

Aspects Hummingbird feeder from www.aspectsinc.com/2_hummingbird.htm.*
Perkey Pet Brand Hummingbird Feeder, no date, pp. 1-5.
Hummingbird Feeders, Hummingbirds.net, no date, pp. 1-8.
Wild Birds Unlimited, Your Backyard Bird Feeding Hobby Guide, no date, p. 1-8.
Aspects, Wild Bird Feeders Thermometers and Accessories, 2000, pp. 1-16.

* cited by examiner

*Primary Examiner*—Son T. Nguyen
(74) *Attorney, Agent, or Firm*—Ziolkowski Patent Solutions Group, SC

(57) ABSTRACT

A system and method for a bird feeder is disclosed. The feeder includes a feed reservoir positioned under a shade. The shade has a diameter that is at least twice as large as the diameter of the feed reservoir and located above the feed reservoir such that the shade substantially covers the reservoir thereby limiting the impingement of direct sunlight on the reservoir. By limiting the amount of direct sunlight received by the reservoir the freshness of the feed can be more efficiently maintained.

26 Claims, 2 Drawing Sheets

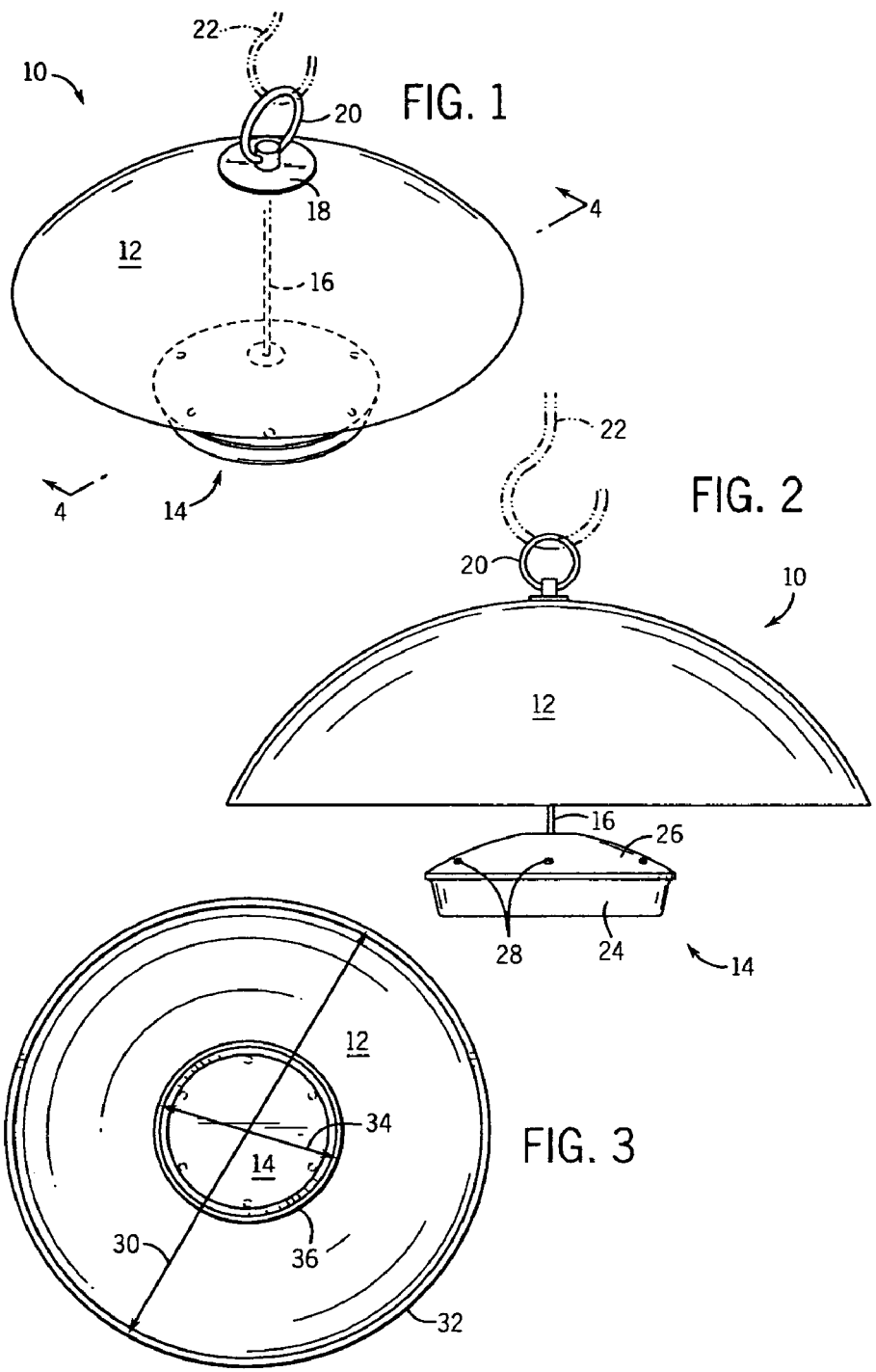

SHADE FOR HUMMINGBIRD FEEDER

BACKGROUND OF INVENTION

The present invention relates generally to bird feeders, and more particularly, to a hummingbird feeder having a shade of sufficient size to prevent the premature spoiling of the liquid used to feed the hummingbirds due to both temperature and evaporation caused by exposure of the feed reservoir to sunlight.

Many individuals enjoy feeding and observing birds, particularly hummingbirds. The birds are often observed in relative proximity to a hummingbird feeder which is typically somewhere within view of a person's residence. As such, the feeders are often located in front of windows or located within garden areas. Conventional feeders for hummingbirds utilize a reservoir with a base that is refillable and a top that is structured to accommodate the slender beak of a hummingbird. Feeders are also adapted to prevent insects from feeding at the feeder. Insects of particular concern include bees and wasps as well as ants as these insects are especially attracted to the sugar based fluid typically disposed in hummingbird feeders.

In an effort to prevent bees and wasps and other insects from feeding at the feeder, feeders have been adapted to prevent the insects from accessing the nectar placed in the reservoir by having specially adapted openings in the feeder that accommodate only the long slender beak of a hummingbird. Additionally, bees and wasps are particularly attracted to the color yellow, therefore, avoiding incorporation of yellow parts with a feeder helps to prevent bees and wasps from noticing the feeder despite having sugar water disposed therein. In contrast, hummingbirds are attracted to ultraviolet colors. As such, use of ultraviolet colors other than yellow is preferred to attract to a hummingbirds without attracting nuisance bees and wasps.

Other feeders incorporate a moat in an effort to prevent crawling insects from feeding at the feeder. These moats are designed as a fluid reservoir such that crawling insects are required to cross the fluid filled reservoir in order to feed at the feeder. Other moat-based feeders implement a sticky substance that the insects must traverse in order to feed at the feeder. The purpose of this design is to cause the insects to stick in the sticky substance in the moat thereby preventing their feeding at the feeder. It would therefore be desirable to have a bird feeder constructed so to only accommodate the feeding of hummingbirds.

Hummingbird feeders typically include a fluid reservoir for containing nectar. This nectar is usually sugar water and can vary in concentration from a ratio of 1:1 to 1:5 parts sugar to parts water. The higher the concentration of sugar to water placed in the feeder, the more attractive the feeder will be to hummingbirds. Additionally, the feeder will not require the addition of additives such as honey, brown sugar, fruit, or red food coloring to the fluid in order to attract hummingbirds. The affects of these additives on the hummingbirds is also uncertain, therefore their use is not preferred.

However, the higher the concentration, the less frequently those birds that are attracted to the feeder will need to feed. It has been suggested that once hummingbirds have been attracted to a feeder's position, the concentration of the liquid placed in the feeder reservoir can be reduced to more diluted concentrations in order to entice those hummingbirds that have been attracted to the feeder to feed more often.

In addition to the hummingbirds sensitivity to the concentration of the liquid placed in the feeder, hummingbirds are also sensitive to the quality of the fluid in the feeder and may abandon a feeder that contains liquid that has spoiled. Spoilage can result from mold within the liquid reservoir, fermentation of the solution, or contaminants within the solution. A number of methods have been developed to extend the life of the fluid. For example, boiling the water to be used in the solution before measuring can retard spoilage of the liquid in the feeder by a day or two. Others suggest that using distilled water instead of boiled water can also add to the life of the fluid. However, it has been suggested that distilled water may lack minerals that hummingbirds need; therefore its use should be limited.

A significant accelerant to the spoilage of the fluid is warm weather and direct sunlight. Certain mixtures can spoil in as little as a few hours when exposed to direct sunlight in warm weather and would then require near-immediate replacement in order to maintain hummingbird feeding. Some ornithologists have speculated that a hummingbird would starve rather than consume spoiled nectar.

Additionally, it is generally accepted that the feeder should be cleaned and inspected at every filling. The preferred method for cleaning a hummingbird feeder is with hot tap water and a brush. Sometimes a black mold will appear within the feeder. This mold can be removed by soaking the entire feeder in a diluted bleach bath. Additionally, if the solution appears cloudy it has spoiled and will therefore no longer be consumed by hummingbirds. This process of cleaning the hummingbird feeder is time consuming. By extending the life of the nectar between filling and spoilage, the feeder will, as a result, require less cleanings.

It would therefore be desirable to have a system and method of supplying a feed solution only to hummingbirds while preventing premature spoilage of the feed solution due to sunlight exposure.

BRIEF DESCRIPTION OF INVENTION

The present invention provides a system and method of providing a shade for a hummingbird feeder reservoir overcoming the aforementioned drawbacks.

In the present invention, a hummingbird feeder is constructed from a center post, a shade, and a reservoir. The shade is constructed to prevent direct sunlight from impinging on the reservoir. The amount of sunlight exposure of the reservoir is determined by the distance thee reservoir suspends below the hood, the size of the hood, and the size of the reservoir. Preferably, the feeder is constructed to provide unfettered access to hummingbirds but limit the amount of direct sunlight received by the reservoir to delay, if not prevent, spoilage of the feed. By employing the sufficiently sized shade, spoilage can be delayed thereby resulting in better feeding exposure for the bird as well as more pleasurable viewing for the birdwatcher. An ornamental shade is also contemplated.

In accordance with one aspect of the present invention, a hummingbird feeder is constructed from a fluid reservoir, a shade having a diameter that is at least twice as large as the diameter of the fluid reservoir, and a center post with ends connecting the shade to the fluid reservoir such that the shade substantially covers the fluid reservoir.

In accordance with a further aspect of the present invention, a hummingbird feeder includes a liquid reservoir that has a plurality of openings that only accommodate feeding by hummingbirds. A hood is positioned over the liquid reservoir and constructed to shade the liquid reservoir from direct sunlight by having a profile that is larger than the profile of the liquid reservoir. A center post connects the liquid reservoir to the hood.

According to yet another aspect of the invention, a feeder has a reservoir that is constructed to feed hummingbirds. A center post is connected to the reservoir and extends from the reservoir. A hood is positioned above the reservoir and connected to the extending center post. A combination of the ratio of the outer perimeter of the hood to the outer perimeter of the reservoir and a ratio of a distance the reservoir extends below the hood to a diameter of the hood dictate an arrangement such that the hood casts a shadow over the reservoir for a majority of the distance a light source travels when the light source travels over the feeder from a first horizon to a second horizon 180° from the first horizon.

In accordance with a further aspect of the presenting invention, a bird feeder provides a means for providing sugar solution to a hummingbird, a means for providing shade to the means for providing sugar solution, and a means for attaching the means for providing shade to the means for providing sugar solution to form a single feeder capable of preventing heating of the means for providing sugar solution due to sunlight exposure.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings:

FIG. 1 is a top perspective view of the hummingbird feeder.

FIG. 2 is a side elevation view of that shown in FIG. 1.

FIG. 3 is a top view of that shown in FIG. 1.

DETAILED DESCRIPTION

Figure 4:
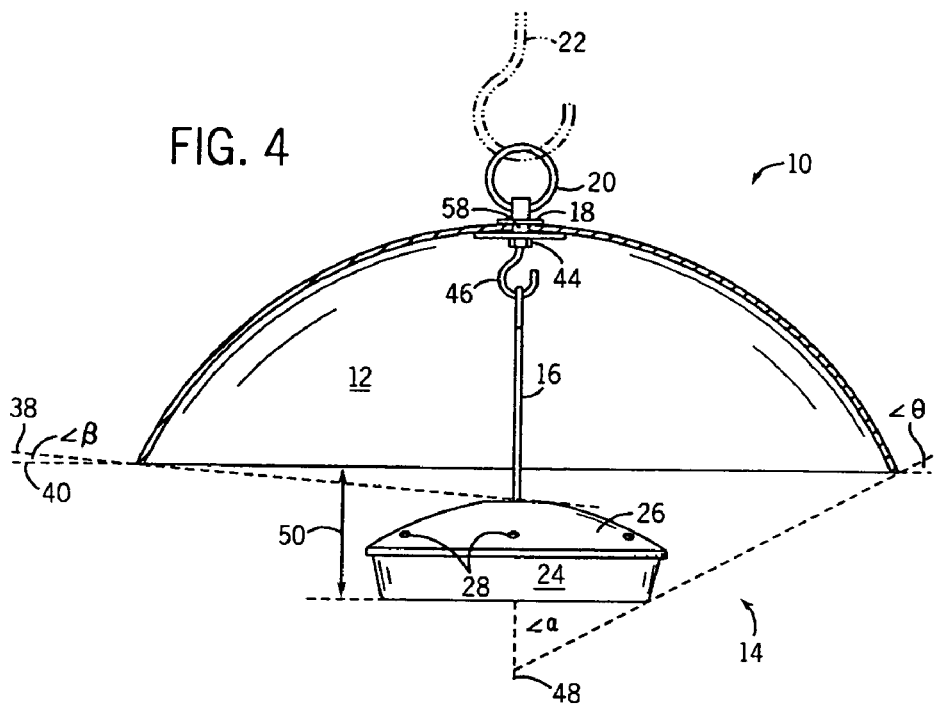
FIG. 4 is a cross-sectional view of the hood shown in FIG. 2.

The present invention will be described with respect to a hummingbird feeder, but may be incorporated in other types of bird feeders where it is desirable to delay spoilage of the bird feed typically attributed to extended exposure to direct sunlight.

FIG. 1 shows a hummingbird feeder 10 including a reservoir 14, a hood or shade 12, and a center post 16 shown in phantom connecting the hood to the reservoir. The feeder includes a hanging loop 20 located above the hood 12. The hanging loop 20 is used to suspend the feeder from hook 22. Hook 22, shown in phantom, can be any means of hanging the feeder in a desired location such as from a tree limb, yard stake, or the eave of a home. The fluid reservoir 14 is constructed to suspend from the center post below the hood. Only a portion of the reservoir 14 is visible from this top perspective view. As shown, a majority of the reservoir 14 is shaded by the hood 12. Preferably, the hood is fabricated from an opaque material and therefore does not allow the passage of light therethrough. While construction of the hood from an opaque material is preferred, it is not necessary for implementation in areas prone to some shade as the advantage of the present invention can be achieved without a completely opaque hood.

Referring to FIG. 2, the profile of the feeder shows the inverted bowl shape of the shade 12 positioned above the liquid reservoir 14. The liquid reservoir 14 includes a lid 26 and a base 24. As is readily apparent and will be discussed in greater detail below, the size of the hood 12 is much greater than the size of the reservoir 14. Preferably, hood 12 is at least twice as large as reservoir 14. The lid includes a plurality of openings 28 constructed of sufficient size to only accommodate feeding of a hummingbird. That is, the openings are designed to only receive a long slender beak. The feeder is shown suspended from a hook 22, shown in phantom, inserted through loop 20 of center post 16 that extends from the feeder 10 above the hood 12.

Referring to FIG. 3, the fluid reservoir 14 is shown as being concentric to the hood. This view shows the footprint of the hood as well as the footprint of the fluid reservoir. The area of the footprint of the hood in the illustrated embodiment is shown to be at least six times greater than the area of the footprint of the fluid reservoir. However, it is understood that multiple variations of this configuration are within the scope of the present invention. Additionally, FIG. 3 shows the perimeter 32 of the hood 12 as an outer concentric circle to the perimeter 36 of the liquid reservoir 14. As shown, the fluid reservoir 14 is concentrically positioned under the hood 12 and has a diameter 34 that is no less than one half the diameter 30 of the hood 12.

The perimeter 32 of the hood 12 and the perimeter 36 of the reservoir 14 form a first ratio. This ratio is used to determine the construction of the feeder. The ratio relates to both the amount of protection the hood 12 provides the reservoir 14 from direct sunlight and the amount of clearance between the fluid reservoir 14 and the shade 12 afforded hummingbirds that utilize the feeder. Preferably, the diameter 30 of the hood 12 is at least twice the diameter 34 of the reservoir 14. Additionally, the top 26 of the reservoir 14 is preferably constructed to suspend between 2–3 inches below the base 40 of the hood 12. This allows sufficient clearance for the hummingbird to access the feed.

FIG. 4 is a cross-sectional view taken along line 4—4 of FIG. 1. The diameter 30 of the hood 12 represents the diameter of the lower-most plane, or base 40 of the hood 12. This diameter in combination with the distance 50 that the liquid reservoir 14 extends below the hood 12 forms a second ratio to be considered in the construction of the feeder. The ratios define a construction that can be established to accommodate feeding of a hovering hummingbird by not having the hood 12 interfere with the wing strokes of the hummingbird. While limiting the impingement of direct sunlight on the reservoir, hook 46 is disposed underneath hood 12 and enables a threaded stud or screw 44 that extends through an opening 58 and washer 18 of the hood 12 and attaches to ring 20. With this construction, reservoir 14 may be removed by dislodging post 16 from hook 46 without detaching the hood 12 from hook 22.

Angle α represents the minimum angle, preferably approximately forty degrees, that can be achieved between a line 42 tangent to a lower most portion of the hood 12 and tangent to a lower most portion of the liquid reservoir 14 and intersecting the axis 48 of the center post 16. This angle is also used to define the exposure of the reservoir to direct sunlight as well as the distance between the fluid reservoir 14 and the hood 12. This distance defines the amount of access hummingbirds have between the feeder and the hood. The angle β, preferably about five degrees, indicates the angle formed between the base 40 of the hood 12 and line 38. Line 38 is tangent to a lower-most portion of the hood 12 and an upper-most portion of the liquid reservoir 14. A light source located at an angle greater than β above the base 40 of the hood 12 will provide shade to the fluid reservoir 14. Providing shade to the reservoir 14 reduces heating of fluid in the reservoir by direct sunlight. Angle 0 represents a minimum angle a light source can be above the horizon in order for the entire liquid reservoir 14 to be shaded from direct sunlight by the hood 12. The angle is formed between line 42 and the base 40 of the hood 12.

As a light source travels from a horizon to angle β, the fluid reservoir 14 is not directly protected from the light source by the shade 12. Once the light source achieves an angle of at least β, the fluid reservoir 14 is afforded some shading by the hood 12. As the light source travels from angle β to θ, the fluid reservoir is afforded more protection by the shade 12 from the direct impingement of the light sources rays. Once the light source reaches an angle of at least θ above a horizon, the fluid reservoir is afforded complete protection by the shade 12 from the direct impingement of rays from the light source. As long as the light source is located more than θ degrees above the horizon, the fluid reservoir 14 will be entirely protected by the shade 12 from the direct impingement of light rays from the light source. Angle θ is selected to be as close to the value of β as possible without preventing bird access to the feed. The closer θ is to β, the less direct sunlight that is received. Preferably, θ has a value no greater than about fifty degrees.

Figure 5:
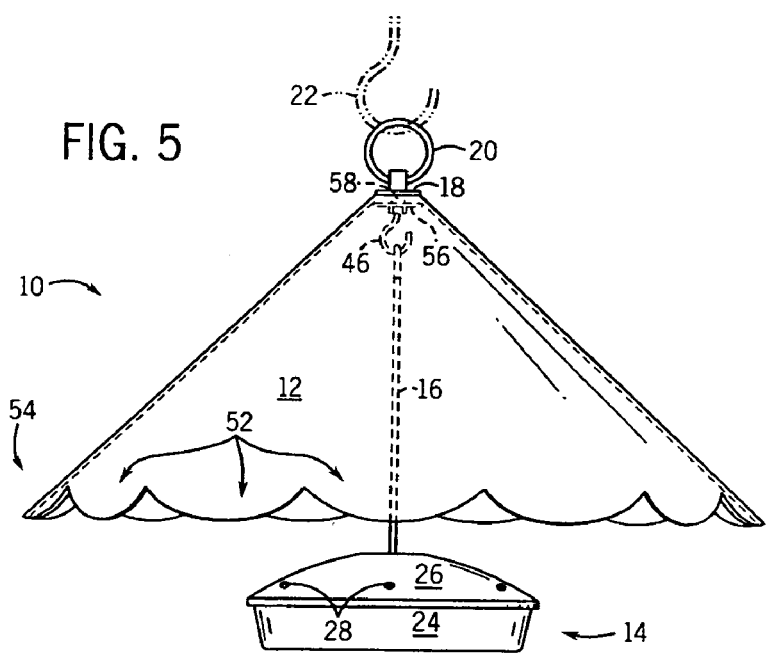
FIG. 5 is a side elevational view of another embodiment of the present invention.

FIG. 5 shows an alternative embodiment of the present invention which provides that the hood 12 has a frustoconical shape and includes a plurality of scallops 52 around the perimeter of the lower end 54. Similar to the embodiment of FIG. 1, the center post 16 is also shown in phantom and is connected to a reservoir 14 such that the reservoir 14 can be removed from the hood 12 to allow a person to refill and/or clean the reservoir 14 without the reservoir being attached to the feeder 10. It is to be understood that the same ratios and angles discussed with respect to FIGS. 3 and 4 are also applicable to this embodiment and as such would be used in determining the amount of direct sunlight exposure of the reservoir 14 and appropriate distances between the reservoir 14 and the hood 12 such that the hood 12 does not interfere with the feeding by hummingbirds.

Although it is not shown in the figures, it is to be understood that both the hood and the reservoir can be decorated in such a manner as to increase the feeder's ability to attract hummingbirds. Through the application of both bright colors and flower patterns, the feeder can be constructed to more efficiently attract hummingbirds or visually appeal to the feeder's owner.

The present invention has been described in terms of the preferred embodiment, and it is recognized that equivalents, alternatives, and modifications, aside from those expressly stated, are possible and within the scope of the appending claims.

What is claimed is:

1. A hummingbird feeder comprising:
   a hummingbird feeder having a fluid reservoir;
   a center post having first and second ends, wherein the first end is attached to the fluid reservoir; and
   an opaque shade having a diameter that is at least twice as large as a diameter of the fluid reservoir and connected to the second end of the center post such that the shade substantially covers the fluid reservoir.

2. The hummingbird feeder of claim 1 wherein the fluid reservoir further comprises a lid with a plurality of feed holes, and a base.

3. The hummingbird feeder of claim 1 wherein an uppermost portion of the fluid reservoir is a distance below a lowermost plane of the opaque shade that is less than a depth of the fluid reservoir.

4. The hummingbird feeder of claim 1 wherein the opaque shade is an inverted bowl shape.

5. The hummingbird feeder of claim 1 wherein the opaque shade is a conical shape and includes a plurality of scallops around a perimeter of a lower end.

6. The hummingbird feeder of claim 1 wherein the fluid reservoir is decorated to attract hummingbirds.

7. The hummingbird feeder of claim 1 wherein the center post has a shade portion and a fluid reservoir portion whereby the fluid reservoir portion can be separated from the shade portion.

8. A bird feed comprising:
   a hummingbird feeder having a liquid reservoir, the liquid reservoir having therein a plurality of openings to only accommodate feeding by a hummingbird;
   a hood positioned over the liquid reservoir and constructed to shade the liquid reservoir from direct sunlight by having a profile larger than that of the liquid reservoir; and
   a center post connecting the liquid reservoir to the hood such that the liquid reservoir is below a plane of the hood a distance that is less than a depth of the hood.

9. The bird feeder of claim 8 wherein the hood has a footprint that is at least six times greater than the footprint of the liquid reservoir.

10. The bird feeder of claim 8 wherein the hood is opaque and has a diameter that is at least twice as large as the diameter of the liquid reservoir.

11. The bird feeder of claim 8 wherein the hood provides shade to the liquid reservoir when a light source is positioned at least five degrees from a horizon.

12. The bird feeder of claim 8 wherein the center post further comprises a hood section and a reservoir section wherein the hood section and reservoir section are separable and provide a separation between the hood and the liquid reservoir.

13. The bird feeder of claim 8 wherein the liquid reservoir is colored to attract hummingbirds.

14. The bird feeder of claim 8 wherein the liquid reservoir further comprises a lid and a base.

15. The bird feeder of claim 8 wherein a line tangential to a lowest-most point of the liquid reservoir and a lowest-most point of the hood intersects an axis of the center post at an angle of at least forty degrees.

16. A bird feeder comprising:
   a feeder having therein a reservoir constructed to feed hummingbirds;
   a center post connected to the reservoir and extending therefrom; and
   a hood positioned above the reservoir and connected to the center post wherein a combination of a ratio of an outer perimeter of the hood to an outer perimeter of the reservoir and a ratio of a distance the reservoir extends below the hood to a diameter of the hood dictate an arrangement whereby the hood casts a shadow entirely over the reservoir for a majority of a travel distance of a light source passing over the feeder as the light source moves from a first horizon to a second horizon 180° from the first horizon.

17. The bird feeder of claim 16 wherein the hood is opaque.

18. The bird feeder of claim 16 wherein the reservoir further comprises a lid and a base, the lid having therein a plurality of openings to only accommodate feeding by a hummingbird.

19. The bird feeder of claim 16 wherein the ratio of the outer perimeter of the hood to the outer perimeter of the reservoir is at least two to one.

20. The bird feeder of claim 16 wherein the hood is decorated to attract hummingbirds.

21. The bird feeder of claim 16 wherein the reservoir is decorated to attract hummingbirds.

22. A bird feeder comprising:
means for providing sugar solution to a hummingbird;
means for providing shade to the means for providing sugar solution; and
means for attaching the means for providing shade to the means for providing sugar solution to form a single feeder capable of preventing heating of the means for providing sugar solution due to sunlight exposure wherein the means for providing sugar solution is a distance below the means for providing shade and the distance is less than a diameter of the means for providing sugar solution.

23. The bird feeder of claim 22 wherein the means for providing sugar solution further comprises a plurality of holes thereby allowing only feeding of hummingbirds.

24. The bird feeder of claim 22 wherein the means for providing shade does not allow sunlight to pass through it.

25. The bird feeder of claim 22 wherein the means for providing shade and the means for providing sugar solution are colored to attract hummingbirds.

26. The bird feeder of claim 22 wherein the means of attaching provides for separating the means for providing sugar solution from the means for providing shade.

* * * * *

UNITED STATES PATENT AND TRADEMARK OFFICE
CERTIFICATE OF CORRECTION

| | |
|---|---|
| PATENT NO. | : 7,162,975 B1 |
| APPLICATION NO. | : 10/248569 |
| DATED | : January 16, 2007 |
| INVENTOR(S) | : Uta Nauert |

Page 1 of 1

It is certified that error appears in the above-identified patent and that said Letters Patent is hereby corrected as shown below:

Col. 6, line 16 delete "feed" and substitute therefore -- feeder --.

Signed and Sealed this

Twenty-second Day of May, 2007

JON W. DUDAS
*Director of the United States Patent and Trademark Office*